UNITED STATES PATENT OFFICE.

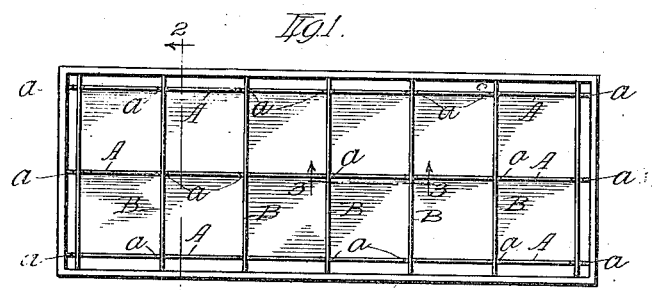
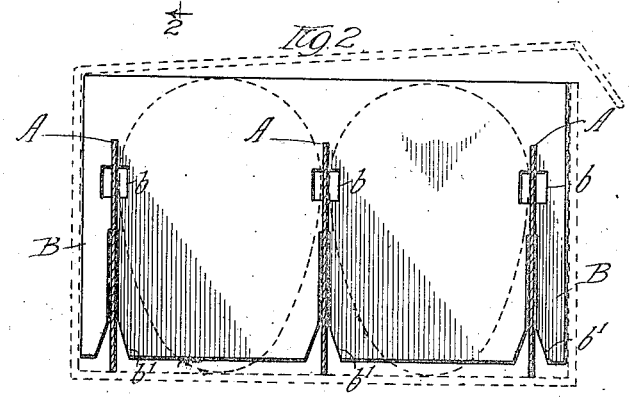
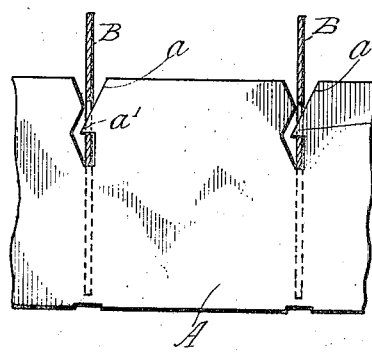
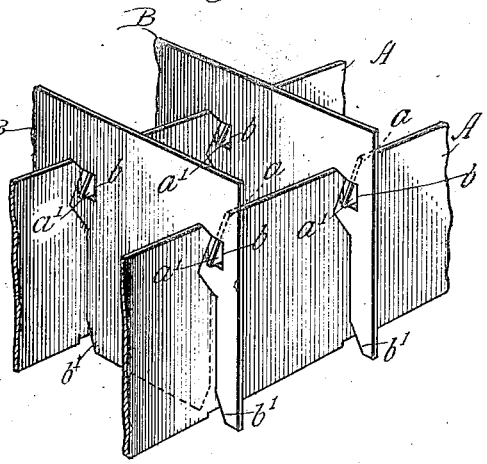

HENRY F. SCHURMANN, OF CHICAGO, ILLINOIS.

EGG-FILLER.

1,312,502.  Specification of Letters Patent.  Patented Aug. 5, 1919.

Application filed January 19, 1915. Serial No. 3,011.

*To all whom it may concern:*

Be it known that I, HENRY F. SCHURMANN, a citizen of the United States of America, and resident of Chicago, Cook county, Illinois, have invented a certain new and useful Improvement in Egg-Fillers, of which the following is a specification.

My invention relates to fillers for use in separating and holding the eggs in place in an egg carton or other receptacle.

The principal object of my invention is to provide an improved construction and arrangement, in an egg filler of this kind, which will tend to facilitate the handling of the eggs, and which will also serve to bring the eggs more fully and conspicuously into view, thereby enhancing the appearance of the carton or receptacle when filled with eggs, as will hereinafter more fully appear.

To these and other useful ends, my invention consists in matters hereinafter set forth and claimed.

In the accompanying drawings—

Figure 1 is a plan of an egg box or carton provided with a filler embodying the principles of my invention.

Fig. 2 is an enlarged vertical cross section of the filler on line 2—2 in Fig. 1.

Fig. 3 is an enlarged detail section on line 3—3 in Fig. 1.

Fig. 4 is a perspective of a portion of said filler.

As thus illustrated, my invention comprises a plurality of longitudinal walls or strips A arranged parallel and connected together by transverse partitions B, whereby the structure is divided into a plurality of square cells or compartments for the eggs. As shown, the strips or walls A are provided in their upper edges with zigzag shaped notches $a$ which are provided with engaging portions $a^1$, and the said partitions B are formed with rectangular openings $b$ for engaging said portions when the strips and partitions are assembled together. Directly below the said openings $b$ the said partitions are provided with straight notches $b^1$ which receive the portions of the strips A directly below the notches $a$, so that the partitions B are supported by the strips A, and whereby the strips or walls A are spaced apart and held in position in the desired manner.

The partitions B are preferably of full height, or what may be called egg-height, whereby the cover (shown in dotted lines in Fig. 2) of the carton will rest on the upper edges thereof and not crush the eggs. The eggs rest on the bottom of the carton below the lower edges of the strips A, as shown in Fig. 2. The strips or walls A are, however, substantially reduced in height throughout their entire length in order to bring their upper edges quite a distance below the upper edges of the partitions B, and a substantial distance below the upper ends or tops of the eggs. In other words, the strips A are less than egg-height, being almost a fourth less than such height. In this way, it will be seen, the eggs are not only more accessible for removal from the filler, but in addition, and when the carton is viewed from the front, the view of the eggs is not obstructed. In other words, and by thus reducing the height of the longitudinal strips or partitions A, so that the difference in height is approximately one fourth the height of the partitions, the eggs are brought more prominently and conspicuously into view than is the case when these strips or walls are the same or substantially the same height as the transverse partitions.

Of course, I do not limit myself to the exact construction shown and described, inasmuch as one or more of the longitudinal strips or walls A might be made of the customary height without departing from the spirit of my invention. The walls of the box or carton, it will be seen, are the same in height as the partitions B, whereby the longitudinal walls A all have their lower edges disposed a substantial distance below the top of the box. The ends of said walls and partitions of the filler project a slight distance all around the latter, whereby narrow cushioning spaces are formed outside of the filler and between the eggs and the walls of the box. The filler is that type which is designed to hold a dozen eggs, and with the construction shown the two longitudinal rows of eggs are brought plainly into view when the cover is raised and the box is viewed from the front.

In Fig. 2, it will be seen that the partitions B extend to the top of the carton, but that the upper edges of the longitudinal strips A are a substantial distance below the cover of the carton, when the box is closed. Thus, when the eggs are in place, the strips A are practically invisible, thereby producing an attractive effect and displaying the eggs to better advantage.

The important thing, therefore, is the construction of the egg filler with the partitions B suitably wider than the longitudinal walls A, whereby the upper edges of the said walls A are a substantial distance below the tops of the eggs, said edges being thus practically concealed when the box is opened and viewed from the front.

The side and end walls of the carton or box, as shown in Figs. 1 and 2, are substantially the same height as the eggs, but the longitudinal strips A are much less than egg-height, the difference in height between these strips and the partitions B being substantially a fourth of the height of the said partitions, whereby the edges of said strips are well below the tops of the eggs, and also below the upper edge of the front wall of the carton or box, this difference in height between the longitudinal and transverse walls of the egg filler serving to make the eggs more conspicuous, as well as more attractive in appearance, and being especially designed for that purpose. To accomplish the desired result, of course, the filler thus constructed must be combined with a carton or egg-box of the general type shown and described, in which the front and rear walls are much longer than the end walls, so that the natural method of displaying the eggs is to open the box and position it so that its front wall will be toward the customer. When thus viewed from the front, the eggs and front wall of the box practically entirely conceal the upper edges of the strips A and the general appearance is greatly improved.

What I claim as my invention is:—

A receptacle for eggs, comprising a rectangular box having a bottom and cover and end walls, and front and rear walls of greater length than said end walls, said cover being flexibly connected with said rear wall, said walls all being substantially of the same height as the eggs, longitudinal strips extending parallel with said cover from one end wall to the other, said strips being spaced apart a distance substantially equal to the width of the eggs, so that the eggs rest on said bottom, said strips being much less than egg-height so that their upper edges are practically out of sight when the open box of eggs is viewed from the front, and transverse partitions of substantially the same height as the eggs and having openings therein immediately below the upper edges of said strips, with slots extending upward from the lower edges of said partitions and stopping short of said openings, said strips having their upper edge portions formed with downwardly extending zig-zag notches having means to interlock with said openings and slots; said partitions and strips forming a removable filler having egg-cells which are open at top and bottom, each cell being much less than egg-height at front and rear thereof, and the box-bottom forming a support for the lower ends of the eggs, the difference in height as between said strips and partitions being approximately a fourth of the height of the partitions, and said lower edges being raised from said bottom so that said strips are supported by said concealed strips.

Signed by me at Chicago, Illinois, this 5th day of January 1915.

HENRY F. SCHURMANN.

Witnesses:
RACHEL J. RICHARDSON,
ARTHUR N. DURAND.